(12) United States Patent
Klein et al.

(10) Patent No.: US 11,364,709 B2
(45) Date of Patent: Jun. 21, 2022

(54) FUNCTIONAL ELEMENT HAVING ELECTRICALLY CONTROLLABLE OPTICAL PROPERTIES

(71) Applicant: SAINT-GOBAIN GLASS FRANCE, Courbevoie (FR)

(72) Inventors: Marcel Klein, Baesweiler (DE); Alicia Dröge, Aachen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 231 days.

(21) Appl. No.: 16/635,451

(22) PCT Filed: Jul. 17, 2018

(86) PCT No.: PCT/EP2018/069386
§ 371 (c)(1),
(2) Date: Jan. 30, 2020

(87) PCT Pub. No.: WO2019/025178
PCT Pub. Date: Feb. 7, 2019

(65) Prior Publication Data
US 2021/0101370 A1 Apr. 8, 2021

(30) Foreign Application Priority Data

Aug. 1, 2017 (EP) ..................................... 17184156

(51) Int. Cl.
*B32B 3/02* (2006.01)
*B32B 17/10* (2006.01)
(Continued)

(52) U.S. Cl.
CPC .......... *B32B 17/10504* (2013.01); *B32B 3/04* (2013.01); *B32B 17/10005* (2021.01);
(Continued)

(58) Field of Classification Search
CPC ................ B32B 3/04; B32B 17/10504; B32B 17/10036; B32B 17/10302; G02F 1/334
See application file for complete search history.

(56) References Cited

U.S. PATENT DOCUMENTS

| 5,953,150 A | 9/1999 | Smarto et al. |
| 6,001,487 A | 12/1999 | Ladang et al. |

(Continued)

FOREIGN PATENT DOCUMENTS

| DE | 10 2005 007427 A1 | 8/2006 |
| DE | 10 2005 049081 B3 | 6/2007 |

(Continued)

OTHER PUBLICATIONS

International Search Report as issued in International Patent Application No. PCT/EP2018/069386, dated Aug. 10, 2018.

*Primary Examiner* — Elizabeth E Mulvaney
(74) *Attorney, Agent, or Firm* — Pillsbury Winthrop Shaw Pittman LLP

(57) ABSTRACT

A functional element having electrically controllable optical properties, includes a stack sequence of at least a first carrier film, an active layer, and a second carrier film, wherein at least one exit surface of the active layer on at least one lateral face of the stack sequence of the functional element is sealed at least in sections with a barrier material.

14 Claims, 6 Drawing Sheets

Figure 1A:
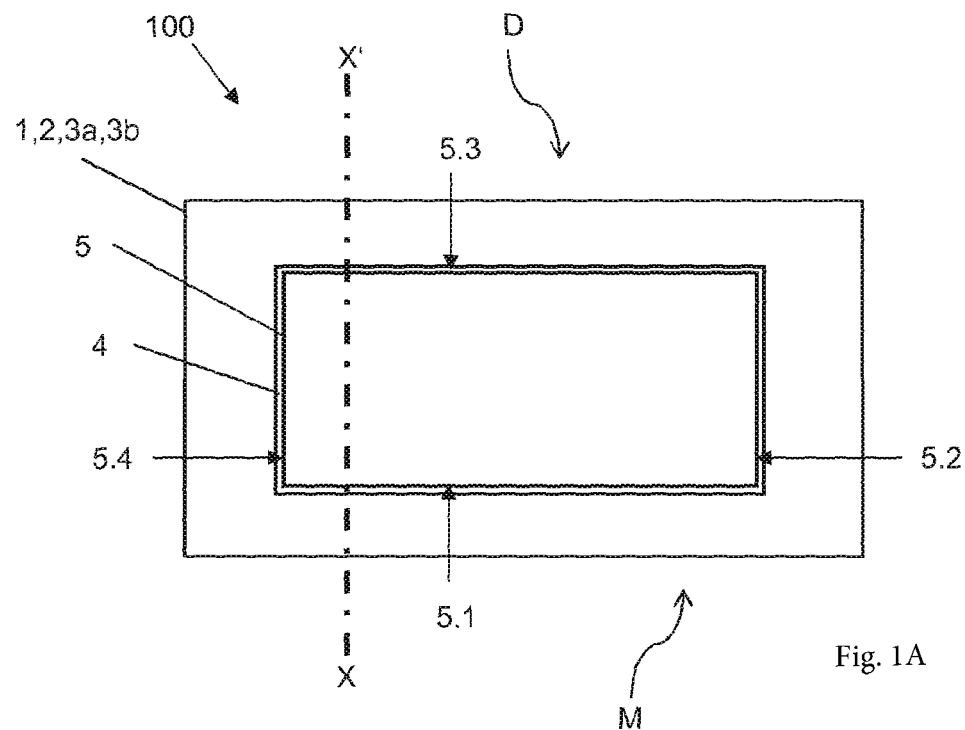

(51) Int. Cl.
  *B32B 3/04* (2006.01)
  *B32B 27/30* (2006.01)
  *B32B 27/36* (2006.01)
  *G02F 1/1334* (2006.01)
  *G02F 1/1339* (2006.01)

(52) U.S. Cl.
  CPC .. *B32B 17/10036* (2013.01); *B32B 17/10302* (2013.01); *B32B 17/10761* (2013.01); *B32B 27/304* (2013.01); *B32B 27/36* (2013.01); *B32B 2605/006* (2013.01); *G02F 1/1334* (2013.01); *G02F 1/1339* (2013.01); *Y10T 428/24777* (2015.01)

(56) References Cited

U.S. PATENT DOCUMENTS

| | | | |
|---|---|---|---|
| 2009/0181203 A1 | 7/2009 | Valentin et al. | |
| 2015/0301367 A1* | 10/2015 | Mennig | G02F 1/157 359/245 |
| 2016/0138328 A1* | 5/2016 | Behmke | G02F 1/1334 349/16 |

FOREIGN PATENT DOCUMENTS

| | | |
|---|---|---|
| DE | 10 2007 027296 A1 | 12/2008 |
| DE | 10 2013 001334 A1 | 7/2014 |
| DE | 10 2013 214552 A1 | 1/2015 |
| EP | 3 085 530 A1 | 10/2016 |
| JP | 2009-534557 A | 9/2009 |
| JP | 2010-162706 A | 7/2010 |
| JP | 2011-524546 A | 9/2011 |
| JP | 2012-159695 A | 8/2012 |
| JP | 2016-509264 A | 3/2016 |
| JP | 2016-204222 A | 12/2016 |
| KR | 10-2015-0092247 A | 8/2015 |
| WO | WO 2007/122427 A1 | 11/2007 |
| WO | WO 2007/122428 A1 | 11/2007 |
| WO | WO 2007/122429 A1 | 11/2007 |
| WO | WO 2010/032068 A1 | 3/2010 |
| WO | WO 2011/033313 A1 | 3/2011 |
| WO | WO 2012/009399 A1 | 1/2012 |
| WO | WO 2014/023475 A1 | 2/2014 |
| WO | WO 2014/072137 A1 | 5/2014 |
| WO | WO 2014/086555 A1 | 6/2014 |
| WO | WO 2016/064667 A | 4/2016 |

* cited by examiner

FUNCTIONAL ELEMENT HAVING ELECTRICALLY CONTROLLABLE OPTICAL PROPERTIES

CROSS-REFERENCE TO RELATED APPLICATIONS

This application is the U.S. National Stage of PCT/EP2018/069386, filed. Jul. 17, 2018, which in turn claims priority to European patent application number 17 184 156.2 filed Aug. 1, 2017. The content of these applications are incorporated herein by reference in their entireties.

The invention relates to a functional element having electrically controllable optical properties, a composite pane with a functional element, and in particular a windshield or a roof panel of a vehicle with an electrically controllable sun visor.

In the vehicle sector and in the construction sector, composite panes with electrically controllable functional elements are often used as sun screens or as privacy screens. Thus, for example, windshields are known in which a sun visor is integrated in the form of a functional element having electrically controllable optical properties. In particular, the transmittance or scattering properties of electromagnetic radiation in the visible spectrum are electrically controllable. The functional elements are usually film-like and are laminated into or glued onto a composite pane. In the case of windshields, the driver can control the transmittance behavior of the pane itself relative to sunlight. Thus, a conventional mechanical sun visor can be dispensed with. As a result, the weight of the vehicle can be reduced and space gained in the roof region. In addition, the electrical control of the sun visor is more convenient for the driver than the manual folding down of the mechanical sun visor.

Windshields with such electrically controllable sun visors are, for example, known from DE 102013001334 A1, DE 102005049081 B3, DE 102005007427 A1, and DE 102007027296 A1.

Typical electrically controllable functional elements are variously described in the prior art, for example, in EP 3 085 530 A1, WO 2014/086555 A1, WO 2007/122429 A1, WO 2007/122428 A1, WO 2011/033313 A1, WO 2014/023475 A1, WO 2007/122427 A1, WO 2012/009399 A1, WO 2010/032068 A1, and WO 2014/072137 A1 and contain, for example, electrochromic layer structures or single particle device (SPD) films. Further possible functional elements for realizing an electrically controllable sun screen are so-called PDLC functional elements (polymer dispersed liquid crystal). Their active layer contains liquid crystals that are embedded in a polymer matrix. When no voltage is applied, the liquid crystals are oriented in a disorderly fashion, resulting in strong scattering of the light passing through the active layer. When a voltage is applied on the surface electrodes, the liquid crystals align themselves in a common direction and the transmittance of light through the active layer is increased. The PDLC functional element acts less by reducing total transmittance, but, instead, by increasing scattering to ensure protection against glare.

Prior art, laminated functional elements and, in particular, PLC functional elements often present, in the edge region, undesirable aging phenomena, such as brightening and changes in shading.

The object of the present invention is, consequently, to provide an improved functional element having electrically controllable optical properties that is improved in particular with regard to its aging resistance.

The object of the present invention is accomplished by a functional element in accordance with the independent claim 1. Preferred embodiments are apparent from the dependent claims.

A functional element according to the invention having electrically controllable optical properties comprises at least a stack sequence of at least a first carrier film, an active layer, and a second carrier film, wherein at least one exit surface of the active layer on at least one lateral face of the functional element is sealed at least in sections with a barrier material.

The stack sequence according to the invention preferably comprises at least: a first carrier film, a first surface electrode, an active layer, a second surface electrode, and a second carrier film that are arranged one over another in this order. The stack sequence is, for example, a prefabricated film that has a suitable size and shape.

Stack sequences of films according to the invention typically have a large surface area but only a low total thickness. In the following, the large surfaces of the stack sequence are referred to as the surface of the upper side and the surface of the lower side, and the surfaces orthogonal thereto, which have only a low width (corresponding to the direction of the low total thickness), are referred to as lateral faces.

The active layer is bounded on both its large surfaces, in each case, by a carrier film and, optionally, in each case, by a surface electrode. Arranged on the lateral faces of the stack sequence comprising a first carrier film, a first surface electrode, an active layer, a second surface electrode, and a second carrier film are in each case the lateral faces of the carrier films, of the surface electrodes, and of the active layer. Since the active layer is covered on its large surfaces by surface electrodes and carrier films, it is only accessible to an external environment on the lateral faces of the stack sequence. The respective sections of the active layer on the lateral faces of the stack sequence are referred to in the context of the invention as "exit surfaces" of the active layer.

The invention is based on the realization of the inventors that aging of an electrically controllable optical functional element occurs substantially through penetration of harmful substances via the exit surface of the active layer or the exit surfaces of the surface electrodes into the interior of the functional element and changes the optical properties of the functional element undesirably, for example, by brightening or by changing the transmittance of the functional element, starting at its side edges. By sealing the functional element with a suitable barrier material, the diffusion of harmful substances into the functional element via its lateral face is inhibited or prevented. The above-mentioned aging phenomena are thus significantly reduced or completely prevented.

In an advantageous embodiment of a functional element according to the invention, the exit surfaces of the active layer are sealed completely with the barrier material on all lateral faces sealed. Thus, particularly reliable sealing of the active layer of the functional element and particularly good aging resistance of the functional element are achieved.

In another advantageous embodiment of a functional element according to the invention, at least one of the lateral faces is completely sealed and preferably all lateral faces are completely sealed with the barrier material. Thus, even better sealing of the active layer of the functional element and even better aging resistance of the functional element are achieved.

In the context of this invention, "sealed" means that the corresponding section of a face is completely covered with the barrier material as a protective layer and is thus made more resistant and more durable, in particular against the diffusion of harmful substances such as moisture, but also, in particular, of plasticizers from the surroundings into the interior of the functional element and in particular into the active layer.

In an advantageous embodiment of a functional element according to the invention, the barrier material is extruded onto the lateral face of the stack sequence and in particular onto the exit surface or is sprayed onto the lateral face and in particular onto the exit surface. Here, it is particularly advantageous for the barrier material to make a fusion connection or an adhesive connection such as an adhesive connection with at least some layers of the layer stack of the functional element.

It is particularly advantageous for the barrier material to be made of a similar or of the same material as the carrier film. Advantageously, both the barrier material and the carrier film are made of polymers and preferably of thermoplastic polymers. Particularly preferably, the barrier material and carrier film are made substantially of the same thermoplastic polymer and, in particular, substantially of polyethylene terephthalate (PET). Here, a particularly good fusion connection enables particularly good sealing of the lateral face.

The barrier material is preferably heated prior to application on the lateral faces of the stack sequence of the functional element and cooled after application on the functional element such that the barrier material has unstretched polymer chains. This distinguishes the extruded-on or sprayed-on barrier material from, for example, films made of the same material that are stretched or elongated during their production.

The barrier material is advantageously arranged bead-like on the lateral face. The barrier material advantageously is not a barrier film. The barrier material is in particular not a barrier film that is glued onto, placed on, or folded around the lateral face.

It is particularly advantageous for the barrier material to make contact with the carrier films of the functional element while still in the heated state such that a particularly good fusion connection develops through localized melting of the surface of the carrier film coming into contact with the barrier material and the barrier material. Thus, particularly good adhesion of the barrier material to the functional element and particularly good sealing of the lateral faces of the functional element are achieved.

The barrier material is preferably in direct and immediate contact with the functional element. For example, no separate adhesive or other intermediate layer is situated between the barrier material and the stack sequence of the functional element. Thus, the barrier material is, among other things, arranged directly on the exit surface, resulting in particularly good sealing.

In an advantageous embodiment of a functional element according to the invention, the barrier material has, over the exit surface of the active layer, a thickness d (also referred to as "material thickness") of at least 0.1 mm, and preferably at least 0.5 mm. The thickness d is determined orthogonal to the lateral face over the exit surface of the active layer.

In in another advantageous embodiment of a functional element according to the invention, the barrier material has, above the lateral face of the stack sequence of the functional element, a thickness d (also referred to as "material thickness") of at least 0.1 mm, and preferably at least 0.5 mm. The thickness d is determined orthogonal to the lateral face.

A composite pane according to the invention comprises at least a second stack sequence comprising an outer pane, a first intermediate layer, a second intermediate layer, and an inner pane, wherein the intermediate layers contain at least one thermoplastic polymer film with at least one plasticizer and wherein, between the first intermediate layer and the second intermediate layer, a functional element according to the invention having electrically controllable optical properties is arranged at least in sections.

When the functional element is laminated into a composite pane, the diffusion of plasticizers out of the intermediate layers into the interior of the functional element results, with aging, in brightening or a change in transmittance that negatively impacts the through-vision, functionality, and aesthetics of the entire composite pane. By sealing the functional element with a suitable barrier material that inhibits or prevents the diffusion of plasticizers out of the intermediate layer into the functional element and, in particular, into the lateral face of the functional element, such aging phenomena are significantly reduced or completely prevented.

The composite pane can, for example, be the windshield or the roof panel of a vehicle or another vehicle glazing, for example, a glass partition in a vehicle, preferably in a rail vehicle or a bus. Alternatively, the composite pane can be an architectural glazing, for example, in an outer façade of a building or a glass partition in the interior of a building.

The terms "outer pane" and "inner pane" arbitrarily describe two different panes. In particular, the outer pane can be referred to as a first pane; and the inner pane, as a second pane.

In the context of the invention, when the composite pane is intended, in a window opening of a vehicle or of a building, to separate an interior space from the external environment, the pane (second pane) facing the interior (vehicle interior) is referred to as the "inner pane". The pane (first pane) facing the external environment is referred to as the "outer pane". However, the invention is not limited to this.

The composite pane according to the invention contains a functional element according to the invention having electrically controllable optical properties, which is arranged between a first intermediate layer and a second intermediate layer at least in sections. The first and second intermediate layer usually have the same dimensions as the outer pane and the inner pane. The functional element is preferably film-like.

In an advantageous embodiment of a composite pane according to the invention, the intermediate layer contains a polymer, preferably a thermoplastic polymer.

In a particularly advantageous embodiment of a composite pane according to the invention, the intermediate layer contains at least 3 wt.-%, preferably at least 5 wt.-%, particularly preferably at least 20 wt.-%, even more preferably at least 30 wt.-%, and in particular at least 40 wt.-% of a plasticizer. The plasticizer preferably contains or is made of triethylene glycol-bis-(2-ethylhexanoate).

Plasticizers are chemicals that make plastics softer, more flexible, smoother, and/or more elastic. They shift the thermoelastic range of plastics to lower temperatures such that the plastics have the desired more elastic properties in the range of the temperature of use. Other preferred plasticizers are carboxylic acid esters, in particular low-volatility carboxylic acid esters, fats, oils, soft resins, and camphor. Other plasticizers are preferably aliphatic diesters of tri- or tetra-ethylene glycol. Particularly preferably used as plasticizers are 3G7, 3G8, or 4G7, where the first digit indicates the number of ethylene glycol units and the last digit indicates the number of carbon atoms in the carboxylic acid portion of the compound. Thus, 3G8 represents triethylene glycol-bis-(2-ethylhexanoate), in other words, a compound of the formula $C_4H_9CH(CH_2CH_3)CO(OCH_2CH_2)_3O_2CCH(CH_2CH_3)C_4H_9$.

In another particularly advantageous embodiment of a composite pane according to the invention, the intermediate layer contains at least 60 wt.-%, preferably at least 70 wt.-%, particularly preferably at least 90 wt.-%, and in particular at least 97 wt.-% polyvinyl butyral.

The thickness of each intermediate layer is preferably from 0.2 mm to 2 mm, particularly preferably from 0.3 mm to 1 mm, in particular from 0.3 mm to 0.5 mm, for example, 0.38 mm.

In an advantageous embodiment of a functional element according to the invention, the barrier material is formed such that it prevents the diffusion of plasticizers out of the intermediate layer through the barrier material.

In a particularly advantageous embodiment of a functional element according to the invention, the barrier material is plasticizer-poor, preferably with a plasticizer content of less than 3 wt.-%, particularly preferably of less than 1 wt.-%, and in particular of less than 0.5 wt.-%. Most particularly preferably, the barrier material is plasticizer-free, in other words, without specific addition of a plasticizer. The barrier material advantageously contains or is made of a polymer, preferably polyethylene terephthalate (PET) or polyvinyl fluoride (PVF). The barrier material can also contain plasticizer-poor polyvinyl butyral (PVB) with a plasticizer content of less than 3 wt.-%.

The controllable functional element typically comprises a thin, active layer between two surface electrodes. The active layer has the controllable optical properties that can be controlled via the voltage applied to the surface electrodes.

In a composite pane according to the invention, the surface electrodes and the active layer are typically arranged substantially parallel to the surfaces of the outer pane and the inner pane.

The surface electrodes are electrically connected to an external voltage source in a manner known per se. The electrical contacting is realized by suitable connecting cables, for example, foil conductors, which are optionally connected to the surface electrodes via so-called "bus bars", for example, strips of an electrically conductive material or electrically conductive imprints.

The surface electrodes are preferably designed as transparent, electrically conductive layers. The surface electrodes preferably contain at least a metal, a metal alloy, or a transparent conducting (TCO). The surface electrodes can contain, for example, silver, gold, copper, nickel, chromium, tungsten, indium tin oxide (ITO), gallium-doped or aluminum-doped zinc oxide, and/or fluorine-doped or antimony-doped tin oxide. The surface electrodes preferably have a thickness from 10 nm to 2 µm, particularly preferably from 20 nm to 1 µm, most particularly preferably from 30 nm to 500 nm.

In addition to the active layer and the surface electrodes, the functional element can have other layers known per se, for example, barrier layers, blocking layers, antireflective layers, protective layers, and/or smoothing layers.

The functional element is preferably present as a multilayer film with two outer carrier films. In such a multilayer film, the surface electrodes and the active layer are arranged between the two carrier films. Here, the term "outer carrier film" means that the carrier films form the two surfaces of the multilayer film. The functional element can thus be provided as a laminated film that can be processed advantageously. The carrier films advantageously protect the functional element against damage, in particular corrosion. The multilayer film includes, in the order indicated, at least a carrier film, a surface electrode, an active layer, another surface electrode, and another carrier film. The carrier film carries, in particular, the surface electrodes and gives a liquid or soft active layer the necessary mechanical stability.

The carrier films preferably contain at least one thermoplastic polymer, particularly preferably plasticizer-poor or plasticizer-free polyethylene terephthalate (PET). This is particularly advantageous with regard to the stability of the multilayer film. The carrier films can, however, also contain or be made of other plasticizer-poor or plasticizer-free polymers, for example, ethylene vinyl acetate (EVA), polypropylene, polycarbonate, polymethyl methacrylate, polyacrylate, polyvinyl chloride, polyacetate resin, casting resins, acrylates, fluorinated ethylene propylenes, polyvinyl fluoride, and/or ethylene-tetrafluoroethylene. The thickness of each carrier film is preferably from 0.1 mm to 1 mm, particularly preferably from 0.1 mm to 0.2 mm.

Typically, the carrier films have in each case an electrically conductive coating that faces the active layer and functions as a surface electrode.

The functional element according to the invention is preferably a PDLC (polymer dispersed liquid crystal) functional element. The active layer of a PDLC functional element contains liquid crystals that are embedded in a polymer matrix. When no voltage is applied on the surface electrodes, the liquid crystals are oriented in a disorderly manner, resulting in strong scattering of the light passing through the active layer. When a voltage is applied on the surface electrodes, the liquid crystals align themselves in a common direction and the transmittance of light through the active layer is increased. Alternatively, functional elements and, in particular, PDLC functional elements can be used that are transparent when no voltage is applied (0 V) and scatter strongly when a voltage is applied.

In principle, however, it is also possible to use other types of controllable functional elements, for example, electrochromic functional elements or SPD (suspended particle device) functional elements. The controllable functional elements mentioned and their functionality are known per se to the person skilled in the art such that a detailed description can be dispensed with here.

Functional elements are commercially available as multilayer films. The functional element is typically cut in the desired shape and size from a multilayer film with relatively large dimensions. This can be done mechanically, for example, using a knife. In an advantageous embodiment, the cutting is done by laser. It has been shown that, in this case, the lateral face is more stable than with mechanical cutting. With mechanically cut lateral faces, there can be a risk that the material retracts, so to speak, which is noticeable visually and adversely affects the aesthetics of the pane.

In a composite pane according to the invention, the functional element is joined to the outer pane via a region of the first intermediate layer and to the inner pane via a region of the second intermediate layer. The intermediate layers are preferably arranged sheet-wise one over another and laminated together with the functional element inserted between the two layers. The regions of the intermediate layers overlapping the functional element then form the regions that connect the functional element to the panes. In other regions of the pane where the intermediate layers make direct contact with one another, they can fuse during lamination such that the two original layers are possibly no longer recognizable and, instead, there is a homogeneous intermediate layer. The functional element according to the invention with the barrier material is preferably arranged completely within the composite pane and is preferably surrounded on one, three, or all sides by fused intermediate layers.

An intermediate layer can, for example, be formed by a single thermoplastic film. An intermediate layer can also be implemented as a two-ply, three-ply, or multi-ply film stack, wherein the individual films have the same or different properties. An intermediate layer can also be formed from sections of different thermoplastic films whose lateral faces are adjacent.

In an advantageous further development of a composite pane according to the invention, the region of the first or the second intermediate layer via which the functional element is joined to the outer pane or the inner pane is tinted or colored. The transmittance of this region in the visible spectral range is thus reduced compared to a non-tinted or non-colored layer. The tinted/colored region of the intermediate layer thus reduces the transmittance of the windshield in the region of the sun visor. In particular, the aesthetic impression of the functional element is improved because the tinting results in a neutral appearance that affects the observer more pleasantly.

In the context of the invention, "electrically controllable optical properties" means those properties that are infinitely controllable but also those that can be switched between two or more discrete states.

The electrical control of the sun visor is done, for example, by means of switches, rotary or slide controls that are integrated into the dashboard of the vehicle. However, a switch area for controlling the sun visor can also be integrated into the windshield, for example, a capacitive switch area. Alternatively, or additionally, the sun visor can be controlled by contactless methods, for example, by gesture recognition, or as a function of the state of the pupil or eyelid determined by a camera and suitable evaluation electronics. Alternatively, or additionally, the sun visor can be controlled by sensors which detect incidence of light on the pane.

The tinted or colored region of the intermediate layer preferably has transmittance in the visible spectral range of 10% to 50%, particularly preferably of 20% to 40%. Particularly good results in terms of glare protection and optical appearance are thus obtained.

The intermediate layer can be implemented by a single thermoplastic film, in which the tinted or colored region is produced by local tinting or coloring. Such films can be obtained, for example, by coextrusion. Alternatively, an untinted film section and a tinted or colored film section can be combined to form a thermoplastic layer.

The tinted or colored region can be colored or tinted homogeneously, in other words, can have location-independent transmittance. The tinting or coloring can, however, also be inhomogeneous, in particular, a transmittance progression can be realized. In an embodiment, the transmittance level in the tinted or colored region decreases, at least in sections, with increasing distance from the upper edge. Thus, sharp edges of the tinted or colored area can be avoided such that the transition from the sun visor into the transparent region of the windshield is gradual, which appears more attractive aesthetically.

In an advantageous embodiment, the region of the first intermediate layer, i.e., the region between the functional element and the outer pane is tinted. This creates a particularly aesthetic impression when viewing the outer pane from above. The region of the second intermediate layer between the functional element and the inner pane can optionally also be colored or tinted.

The composite pane having an electrically controllable functional element can advantageously be implemented as a windshield with an electrically controllable sun visor. Such a windshield has an upper edge and a lower edge as well as two side edges extending between the upper edge and the lower edge. "Upper edge" refers to that edge that is intended to point upward in the installation position. "Lower edge" refers to that edge that is intended to point downward in the installation position. The upper edge is often referred to as the roof edge; the lower edge, as the engine edge.

Windshields have a central field of vision, for which high optical quality requirements are established. The central field of vision has to have high light transmittance (typically greater than 70%). Said central field of vision is, in particular, that field of vision that is referred to by the person skilled in the art as field of vision B, vision area B, or zone B. The field of vision B and its technical requirements are specified in Regulation No. 43 of the United Nations Economic Commission for Europe (UN/ECE) (ECE-R43, "Uniform Provisions concerning the Approval of Safety Glazing Materials and Their Installation on Vehicles"). The field of vision B is defined in Appendix 18.

The functional element is then advantageously arranged above the central field of vision (field of vision B). This means that the functional element is arranged in the region between the central field of vision and the upper edge of the windshield. The functional element does not have to cover the entire region, but is positioned completely within this region and does not protrude into the central field of vision. In other words, the functional element has a shorter distance from the upper edge of the windshield than the central field of vision. Thus, the transmittance of the central field of vision is not adversely affected by the functional element, which is positioned at a location similar to that of a conventional mechanical sun visor when folded down.

The windshield is preferably intended for a motor vehicle, particularly preferably for a passenger car.

In a preferred embodiment, the functional element, more precisely the lateral faces of the functional element with the barrier material, is circumferentially surrounded by a third intermediate layer. The third intermediate layer is implemented frame-like with a recess into which the functional element is inserted. The third intermediate layer can also be formed by a thermoplastic film, in which the recess was made by cutting. Alternatively, the third intermediate layer can also be composed of a plurality of film sections around the functional element. The intermediate layer is preferably formed from a total of at least three thermoplastic layers arranged sheet-wise one over another, wherein the middle layer has a recess in which the functional element is arranged. During production, the third intermediate layer is arranged between the first and the second intermediate layer, with the lateral faces of all intermediate layers preferably arranged congruently. The third intermediate layer preferably has approx. the same thickness as the functional element. This compensates for the local difference in thickness of the windshield introduced by the locally limited functional element such that glass breakage during lamination can be avoided.

The lateral faces of the functional element visible when looking through the windshield are preferably arranged flush with the third intermediate layer such that no gap exists between the lateral face of the functional element and the associated lateral face of the intermediate layer. This applies in particular to the bottom surface of the functional element, which is typically visible. Thus, the boundary between the third intermediate layer and the functional element is visually less conspicuous.

In a preferred embodiment, the lower edges of the functional element and of the tinted region of the intermediate layer(s) are adapted to the shape of the upper edge of the windshield, creating a visually more appealing appearance. Since the upper edge of a windshield is typically curved, in particular concavely curved, the lower edge of the functional element and of the tinted region are also preferably curved. Particularly preferably, the lower edges of the functional element are substantially parallel to the upper edge of the windshield. It is, however, also possible to construct the sun visor from two straight halves arranged at an angle relative to each other and approximating the shape of the upper edge in a V shape.

In an embodiment of the invention, the functional element is divided into segments by isolation lines. The isolation lines are in particular introduced into the surface electrodes such that the segments of the surface electrode are electrically isolated from one another. The individual segments are connected to the voltage source independently of one another such that they can be actuated separately. Thus, different regions of the sun visor can be switched independently. Particularly preferably, the isolation lines and the segments are arranged horizontally in the installation position. Thus, the height of the sun visor can be controlled by the user. The term "horizontal" is to be interpreted broadly here and refers to a direction of extension that, in a windshield, runs between the side edges of the windshield. The isolation lines do not necessarily have to be straight, but can also be slightly curved, preferably adapted to any curvature of the upper edge of the windshield, in particular substantially parallel to the upper edge of the windshield. Vertical isolation lines are, of course, also conceivable.

The isolation lines have, for example, a width of 5 µm to 500 µm, in particular 20 µm to 200 µm. The width of the segments, i.e., the distance between adjacent isolation lines can be suitably selected by the person skilled in the art according to the requirements of the individual case.

The isolation lines can be introduced by laser ablation, mechanical cutting, or etching during production of the functional element. Already laminated multilayer films can also be subsequently segmented by laser ablation.

The upper edge and the adjacent lateral face or all lateral faces of the functional element are concealed in vision through the composite pane preferably by an opaque masking print or by an outer frame. Windshields typically have a surrounding peripheral masking print made of an opaque enamel, which serves in particular to protect the adhesive used for installation of the window against UV radiation and to visually conceal it. This peripheral masking print is preferably used to also conceal the upper edge and the lateral face of the functional element as well as the necessary electrical connections. The sun visor is then advantageously integrated into the appearance of the windshield and only its lower edge is potentially discernible to the observer. Preferably, both the outer pane and also the inner pane have a masking print such that through-vision is prevented from both sides.

The functional element can also have recesses or holes, for instance, in the region of so-called sensor windows or camera windows. These regions are provided to be equipped with sensors or cameras whose function would be impaired by a controllable functional element in the beam path, for example, rain sensors. It is also possible to realize the sun visor with at least two functional elements separated from one another, with a distance between the functional elements providing space for a sensor window or a camera window.

The functional element (or the totality of the functional elements in the above-described case of a plurality of functional elements) is preferably arranged over the entire width of the composite pane or of the windshield, minus an edge region on both sides having a width of, for example, 2 mm to 20 mm. The functional element also preferably has a distance of, for example, 2 mm to 20 mm from the upper edge. The functional element is thus encapsulated within the intermediate layer and protected against contact with the surrounding atmosphere and corrosion.

The outer pane and the inner pane are preferably made of glass, particularly preferably of soda lime glass, as is customary for window panes. The panes can, however, also be made of other types of glass, for example, quartz glass, borosilicate glass, or aluminosilicate glass, or rigid clear plastics, for example, polycarbonate or polymethyl methacrylate. The panes can be clear, or also tinted or colored. Windshields must have adequate light transmittance in the central field of vision, preferably at least 70% in the primary through-vision zone A per ECE-R43.

The outer pane, the inner pane, and/or the intermediate layer can have further suitable coatings known per se, for example, antireflection coatings, nonstick coatings, anti-scratch coatings, photocatalytic coatings, or solar protection coatings, or low-E coatings.

The thickness of the outer pane and the inner pane can vary widely and thus be adapted to the requirements of the individual case. The outer pane and the inner pane preferably have thicknesses of 0.5 mm to 5 mm, particularly preferably of 1 mm to 3 mm.

The invention further includes a method for producing a functional element according to the invention having electrically controllable optical properties, wherein at least
a) a stack sequence of at least a first carrier film, an active layer, and a second carrier film is provided, and
b) an exit surface of the active layer on at least one lateral face of the functional element is sealed, at least in sections and preferably completely, with a barrier material, wherein, preferably, the barrier material is extruded onto the exit surface or is sprayed onto the exit surface.

Preferably, a stack sequence of at least a first carrier film, a first surface electrode, an active layer, a second surface electrode, and a second carrier film is provided.

The stack sequence is, for example, a prefabricated film that is brought to a suitable size and shape.

During extrusion, the barrier material, which, for example, substantially contains or is made of polyethylene terephthalate (PET), is continuously melted or softened, by a shaping die and applied on the functional element. Subsequently, the barrier material cools on the functional element. A suitable barrier material preferably enters into an adhesive connection or a fusion connection with the functional element. Suitable barrier materials are mentioned above.

Typical temperatures for applying a barrier material are known to the person skilled in the art or can be determined by simple experiments. PET barrier material is typically heated to temperatures between 70° C. and 300° C. The PET does not have to be completely liquid for extrusion, but only softened. Excessively high extrusion temperatures can result in degradation of the PET molecules and degradation of the properties of the barrier material.

In an advantageous embodiment of the method according to the invention, the stack sequence comprising at least a first carrier film, a first surface electrode, an active layer, a second surface electrode, and a second carrier film is arranged completely on a working surface during extrusion, i.e., the stack sequence rests on the working surface, for example, via the surface of the first carrier film facing away from the stack sequence.

Alternatively, the stack sequence can protrude beyond the working surface on the one or all sides such that the barrier material can be extruded particularly evenly onto the lateral faces.

During extrusion, the stack sequence of the functional element is moved relative to the extrusion die. This can be achieved by a stationary extrusion die and a moving stack sequence, by a stationary stack sequence and a moving extrusion die, or by a combination of a moving stack sequence and a moving extrusion die.

The thickness d of the barrier material over the exit surface can be adjusted in a simple manner by the person skilled in the art through suitable selection of the extruder speed, the extrusion temperature, and the speed at which the extrusion die is moved relative to the functional element.

Advantageously, during spraying of the barrier material according to the invention, the heated and liquefied barrier material is atomized in a spray head by a stream of compressed air. The resultant spray mist precipitates onto the lateral faces of the functional element as resolidified barrier material and, for example, completely seals the lateral faces.

During spraying, the stack sequence can be arranged completely on a working surface, i.e., the stack sequence rests on the working surface, for example, via the first carrier film. Alternatively, the functional element can protrude beyond the working surface on all sides such that the barrier material can be sprayed particularly evenly onto the lateral faces of the stack sequence.

During spraying, the functional element is advantageously moved relative to the spray head. This can be achieved by a stationary spray head and a moving functional element, by a stationary functional element and a moving spray head, or by a combination of a moving spray head and a moving functional element.

In an advantageous embodiment of the method according to the invention, the barrier material is sprayed onto all lateral faces of the functional element. In a further development of the method according to the invention, the barrier material is also sprayed onto the surface of the upper side or the surface of the lower side or onto both, in sections or completely.

The stream of compressed air contains or is preferably air, nitrogen, argon, or another protective gas. The barrier material is softened prior to spraying by heating above the softening point, in the example of PET, by heating to 200° C. to 300° C., and, for example, to 250° C.

A further aspect of the invention relates to a method for producing a composite pane according to the invention, wherein in a following step c) an outer pane, a first intermediate layer, the functional element according to the invention having electrically controllable optical properties, a second intermediate layer, and an inner pane are arranged one above another in this order, and d) the outer pane and the inner pane are joined by lamination, wherein an intermediate layer with an embedded functional element is formed from the first intermediate layer and the second intermediate layer.

In an advantageous further development of the method according to the invention, in step c), a third intermediate layer that surrounds the functional element is arranged between the first intermediate layer and the second intermediate layer.

The electrical contacting of the surface electrodes of the functional element is preferably done prior to lamination of the composite pane.

Any imprints, for example, opaque masking prints or printed bus bars for the electrical contacting of the functional element are preferably applied by screen printing.

The lamination is preferably done under the action of heat, vacuum, and/or pressure. Lamination methods known per se can be used, for example, autoclave methods, vacuum bag methods, vacuum ring methods, calender methods, vacuum laminators, or combinations thereof.

The invention further includes the use of a composite pane according to the invention having an electrically controllable functional element as interior glazing or exterior glazing in a vehicle or a building, wherein the electrically controllable functional element is used as a sun screen or as a privacy screen.

The invention further includes the use of a functional element according to the invention in a windshield or roof panel of a vehicle, wherein the functional element is used as a sun visor.

The invention further includes the use of a functional element according to the invention in an interior glazing or exterior glazing in a vehicle or a building, wherein the electrically controllable functional element is used as a sun screen or as a privacy screen.

The invention further includes the use of a composite pane according to the invention as a windshield or roof panel of a vehicle, wherein the electrically controllable functional element is used as a sun visor.

A major advantage of the invention consists in that with composite panes as a windshield, it is possible to dispense with a conventional mechanically foldable sun visor mounted on the vehicle roof. The invention consequently also includes a vehicle, preferably a motor vehicle, in particular a passenger car, that does not have such a conventional sun visor.

The invention also includes the use of a tinted or colored region of an intermediate layer for joining a functional element having electrically controllable optical properties to an outer pane or an inner pane of a windshield, wherein an electrically controllable sun visor is realized by the tinted or colored region of the intermediate layer and the functional element.

Figure 1B:
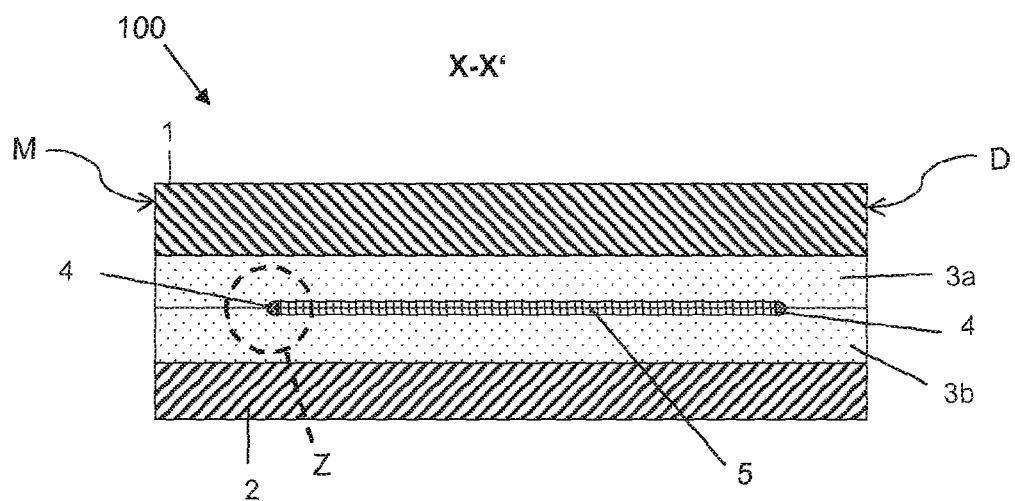
Figure 1C:
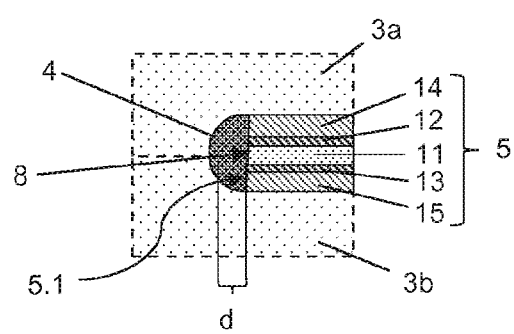
Figure 2A:
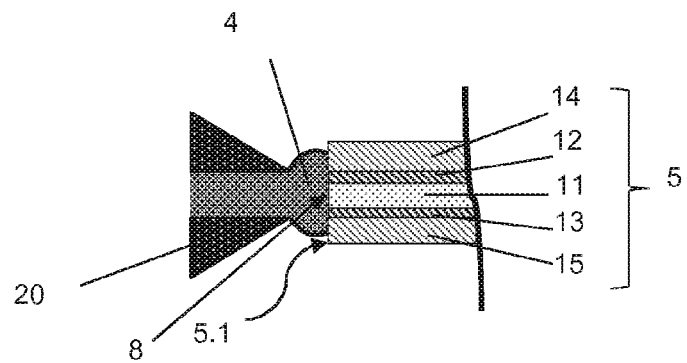
Figure 2B:
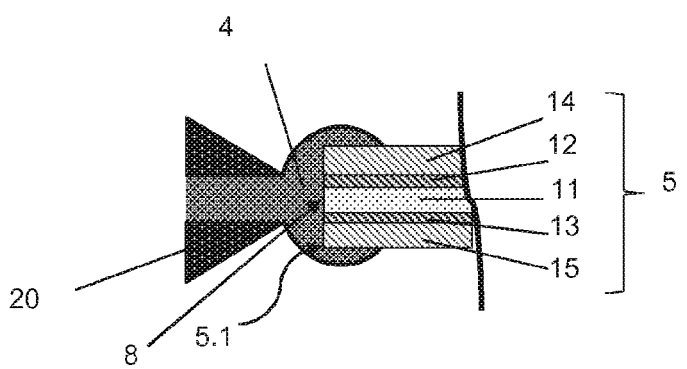
Figure 2C:
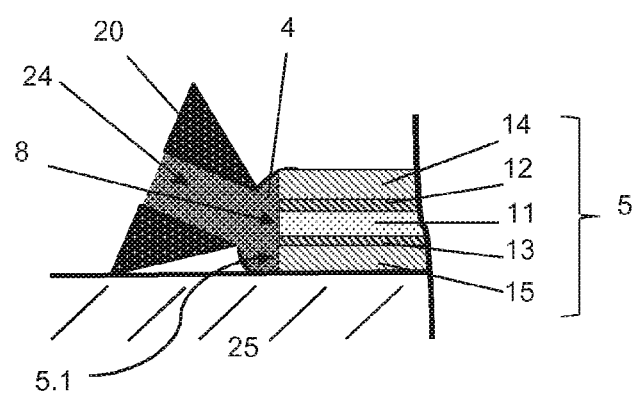
Figure 3:
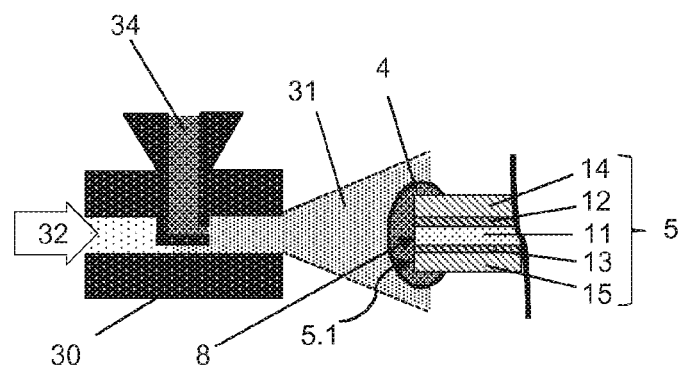
Figure 4A:
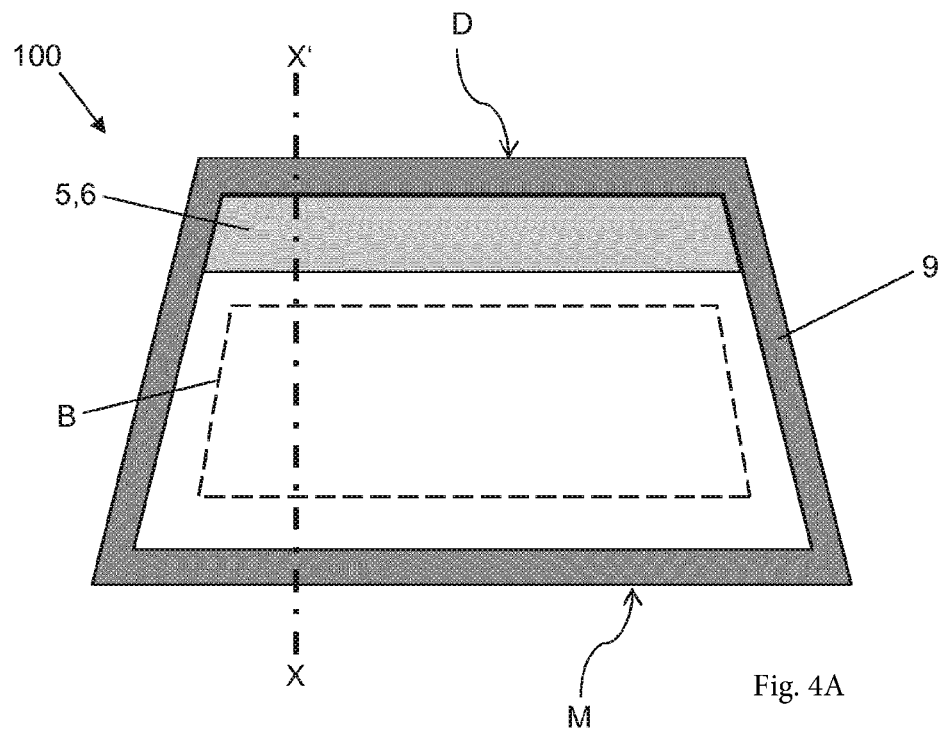
Figure 4B:
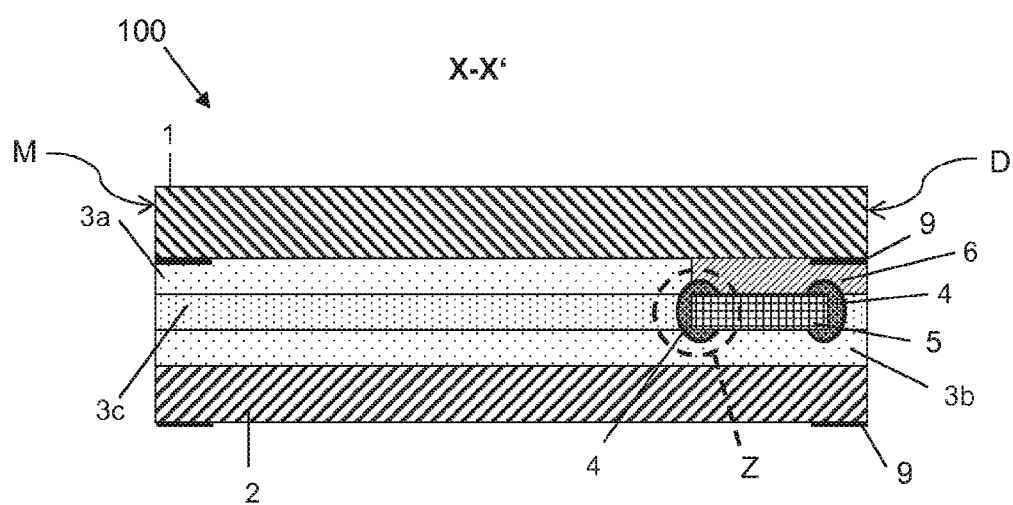

The invention is explained in detail with reference to drawings and exemplary embodiments. The drawings are schematic representations and not to scale. The drawings in no way restrict the invention. They depict:

FIG. 1A a plan view of a first embodiment of a composite pane according to the invention having a functional element according to the invention, FIG. 1B a cross-section through the composite pane of FIG. 1A along the section line X-X', FIG. 1C an enlarged representation of the area Z of FIG. 1B, FIG. 2A an enlarged representation of a detail of a functional element according to the invention during the extrusion of the barrier material, FIG. 2B an enlarged representation of a detail of another example of a functional element according to the invention during the extrusion of the barrier material, FIG. 2C an enlarged representation of a detail of another example of a functional element according to the invention during the extrusion of the barrier material, FIG. 3 an enlarged representation of a detail of another exemplary embodiment of a functional element according to the invention during the spraying of the barrier material, FIG. 4A a plan view of another embodiment of a composite pane according to the invention using the example of a windshield with a sun visor, FIG. 4B a cross-section through the composite pane of FIG. 4A along the section line X-X'.

FIG. 1A, FIG. 1B, and FIG. 1C depict in each case a detail of a composite pane 100 according to the invention. The composite pane 100 comprises an outer pane 1 and an inner pane 2 that are joined to one another via a first intermediate layer 3a and a second intermediate layer 3b. The outer pane 1 has a thickness of 2.1 mm and is, for example, made of a clear soda lime glass. The inner pane 2 has a thickness of 1.6 mm and is, for example, also made of a clear soda lime glass. The composite pane 100 has a first edge designated as D, which is referred to in the following as the "upper edge". The composite pane 100 has a second edge designated as M, which is arranged opposite the upper edge D and is referred to in the following as the "lower edge". The composite pane 100 can be arranged, for example, as architectural glazing in the frame of a window with additional panes to form an insulating glazing unit.

Arranged between the first intermediate layer 3a and the second intermediate layer 3b is a functional element 5 according to the invention, whose optical properties can be controlled by an electrical voltage. For the sake of simplicity, the electrical supply lines are not shown.

The controllable functional element 5 is, for example, a PDLC multilayer film, comprising a stack sequence with an active layer 11 between two surface electrodes 12, 13 and two carrier films 14, 15. The active layer 11 contains a polymer matrix with liquid crystals dispersed therein, which align themselves as a function of the electrical voltage applied on the surface electrodes, by which means the optical properties can be controlled. The carrier films 14, 15 are made of polyethylene terephthalate (PET) and have a thickness of, for example, 0.125 mm. The carrier films 14, 15 are provided with a coating of ITO facing the active layer 11 and having a thickness of approx. 100 nm, forming the surface electrodes 12, 13. The surface electrodes 12, 13 can be connected to the vehicle's electrical system via bus bars (implemented, for example, by a silver-containing screen print) (not shown) and connecting cables (not shown).

The intermediate layers 3a, 3b comprise in each case a thermoplastic film with a thickness of 0.38 mm. The intermediate layers 3a, 3b are made, for example, of 78 wt.-% polyvinyl butyral (PVB) and 20 wt.-% triethylene glycol bis(2-ethylhexanoate) as a plasticizer.

The functional element 5 has on all lateral faces 5.1, 5.2, 5.3, 5.4 a barrier material 4, which, for example, covers the entire lateral face 5.1, 5.2, 5.3, 5.4. The barrier material 4 contains a plasticizer-poor PET and seals in particular the entire exit surface 8 of the active layer 11.

The barrier material 4 is made, here, for example, substantially of PET, i.e., at least 97 wt.-%. The barrier film 4a, 4b contains less than 0.5 wt.-% plasticizer and is suitable for reducing or preventing the diffusion of plasticizer out of the intermediate layers 3a, 3b via the lateral faces 5.1, 5.2, 5.3, 5.4 into the functional layer 5.

The barrier material 4 reduces or prevents diffusion of plasticizer into the active layer 11, thus increasing the service life of the functional element 5. The thickness (or, in other words, the material thickness) d of the barrier material 4 over (i.e., orthogonal to) the exit surface 8 is at least 0.3 mm.

In aging tests, such composite panes 100 show significantly reduced brightening in the edge region of the functional element 5, since diffusion of the plasticizer out of the intermediate layers 3a, 3b into the functional element 5 and resultant degradation of the functional element 5 is avoided.

FIGS. 2A, 2B, and 2C depict in each case enlarged representations of details of functional elements 5 according to the invention during the extrusion of the barrier material 4.

At the time of the extrusions, the barrier material 24 is softened or liquefied by heating above the softening point, in the example of PET, by heating to 250° C. Then, the liquefied or softened barrier material 24 is pressed through an extrusion die 20 and the extrudate is brought into contact with the lateral face 5.1 of the functional element 5. There, the barrier material 4 cools and seals the lateral face 5.1 with the various layers of the functional element 5 and in particular the active layer 11.

The barrier material 4 can be extruded on such that it protrudes beyond the lateral face 5.1 and covers an edge area of the upper side of the second carrier film 14 and the under side of the first carrier film 15, as shown, for example, in FIG. 2B.

As shown in detail in FIG. 2C, the functional element 5 is arranged completely on a working surface 25 during the extrusion, in other words, the functional element 5 rests, for example, on the working surface 25 via the first carrier film 15.

Alternatively, the functional element 5 can protrude beyond the working surface on one or all sides (see, for example, FIG. 2A or 2B) such that the barrier material 4 can be extruded particularly evenly onto the lateral faces.

During the extrusion, the functional element 5 is moved relative to the extrusion die 20. This can be achieved by a stationary extrusion die 20 and a moving functional element 5, by a stationary functional element 5 and a moving extrusion die 20, or a combination of both.

FIG. 3 depicts an enlarged representation of a detail of a functional element 5 according to the invention during the spraying of the barrier material 4. For this purpose, the heated and liquefied barrier material 4 is atomized by a stream of compressed air 32 in a spray head 30. The resultant spray mist 31 precipitates as a re-solidified barrier material 4 on the lateral face 5.1 of the functional element 5 and, in the example depicted here, seals the lateral face 5.1 completely.

During the spraying, the functional element 5 can be arranged completely on a working surface, in other words, the functional element 5 rests on the working surface via the first carrier film 15. Alternatively, the functional element 5 can protrude beyond the working surface on all sides such that the barrier material 4 can be sprayed particularly evenly onto the lateral faces. During the spraying, the functional element 5 is moved relative to the spray head 30. This can be achieved by a stationary spray head 30 and a moving functional element 5, by a stationary functional element 5 and a moving spray head 30, or a combination of both.

The stream of compressed air 32 preferably contains or is air, nitrogen, or another protective gas. The barrier material 34 is softened by heating above the softening point, in the example of PET, by heating to 250° C.

FIG. 4A and FIG. 4B depict in each case a detail of an exemplary composite pane 100 according to the invention as a windshield with an electrically controllable sun visor. The composite pane 100 of FIGS. 4A and 4B corresponds substantially to the composite pane 100 of FIG. 1A-C such that only the differences will be discussed in the following.

The windshield comprises a trapezoidal composite pane 100 with an outer pane 1 and an inner pane 2 that are joined to one another via two intermediate layers 3a,3b. The outer pane 1 has a thickness of 2.1 mm and is made of green-colored soda lime glass. The inner pane 2 has a thickness of 1.6 mm and is made of clear soda lime glass. The windshield has has an upper edge D facing the roof in the installed position and a lower edge M facing the engine compartment in the installed position.

The windshield is equipped with an electrically controllable functional element 5 according to the invention as a sun visor that is arranged in a region above the central field of vision B (as defined in ECE-R 43). The sun visor is formed by a commercially available PDLC multilayer film as the functional element 5 that is embedded in the intermediate layers 3a,3b. The height of the sun visor is, for example, 21 cm. The first intermediate layer 3a is bonded to the outer pane 1; the second intermediate layer 3b is bonded to the inner pane 2. A third intermediate layer 3c position therebetween has a cutout, into which the cut-to-size PDLC multilayer film is inserted precisely, i.e., flush on all sides. The third intermediate layer 3c thus forms, so to speak, a sort of passe-partout for the functional element 5, which is thus encapsulated all around in a thermoplastic material and is protected thereby.

The first intermediate layer 3a has a tinted region 6 that is arranged between the functional element 5 and the outer pane 1. The light transmittance of the windshield is thus additionally reduced in the region of the functional element and the milky appearance of the PDLC functional element 5 in the diffuse state is mitigated. The aesthetics of the windshield are thus significantly more attractive. The first intermediate layer 3a has, in the region 6, for example, average light transmittance of 30%, with which good results are achieved.

The region 6 can be homogeneously tinted. However, it is often visually more appealing if the tinting decreases in the direction of the lower edge of the functional element 5 such that the tinted and the non-tinted regions merge smoothly.

In the case depicted, the lower edges of the tinted region 6 and the lower edge of the PDLC functional element 5 (here, its lateral face 5.1) are arranged flush with the barrier material 4. This is, however, not necessarily the case. It is also possible for the tinted region 6 to protrude beyond the functional element 5 or, vice versa, for the functional element 5 to protrude beyond the tinted region 6. In the latter case, it would not be the entire functional element 5 that would be bonded to the outer pane 1 via the tinted region 6.

The windshield has, as is customary, a surrounding peripheral masking print 9 that is formed by an opaque enamel on the interior side surfaces (facing the interior of the vehicle in the installed position) of the outer pane 1 and of the inner pane 2. The distance of the functional element 5 from the upper edge D and the side edges of the windshield is less than the width of the masking print 9 such that the lateral faces of the functional element 5—with the exception of the side edge facing the central field of vision B—are concealed by the masking print 9. The electrical connections (not shown) are also reasonably mounted in the region of the masking print 9 and thus hidden.

The controllable functional element 5 is a multilayer film, consisting of an active layer 11 between two surface electrodes 12, 13 and two carrier films 14, 15. The active layer 11 contains a polymer matrix with liquid crystals dispersed therein, which align themselves as a function of the electrical voltage applied to the surface electrodes, as a result of which the optical properties can be controlled. The carrier films 14, 15 are made of PET and have a thickness of, for example, 0.125 mm. The carrier films 14, 15 are provided with coating of ITO facing the active layer 11 and having a thickness of approx. 100 nm, forming the electrodes 12, 13. The electrodes 12, 13 can be connected to the vehicle's electrical system, via a bus bar (not shown) (formed, for example, by a silver-containing screen print) and via connecting cables (not shown).

A barrier material 4 is extruded, for example, onto the lateral faces 5.1, 5.2, 5.3, and 5.4 of the functional element 5, analogously to FIG. 2C. In the example depicted, all lateral faces 5.1, 5.2, 5.3, and 5.4 are completely sealed with a barrier material 4 made of plasticizer-poor PET. Thus, the functional element 5 is particularly well protected against aging.

A so-called "high flow PVB", which has stronger flow behavior compared to standard PVB films, can preferably be used for the intermediate layers 3a, 3b, 3c. The layers thus flow around the barrier film 4 and the functional element 5 more strongly, creating a more homogeneous visual impression, and the transition from the functional element 5 to the intermediate layer 3c is less conspicuous. The "high flow PVB" can be used for all or even for only one or more of the intermediate layers 3a, 3b, 3c.

In another example, not illustrated here, the windshield and the functional element 5 with the barrier material 4 substantially correspond to the embodiment of FIGS. 4A and 4 B. The PDLC functional element 5 is, however, divided by horizontal isolation lines into, for example, six strip-like segments. The isolation lines have, for example, a width of 40 μm to 50 μm and are spaced 3.5 cm apart. They were introduced into the prefabricated multilayer film by laser. The isolation lines separate, in particular, the surface electrodes into strips isolated from one another, which have in each case a separate electrical connection. The segments can thus be switched independently of one another. The thinner the isolation lines, the less conspicuous they are. Even thinner isolation lines can be realized by etching.

The height of the darkened functional element 5 can be adjusted by the segmentation. Thus, depending on the position of the sun, the driver can darken the entire sun visor or even only part of it.

In a particularly convenient embodiment, the functional element 5 is controlled by a capacitive switch area arranged in the region of the functional element, wherein the driver determines the degree of darkening by the location at which he touches the pane. Alternatively, the functional element 5 can also be controlled by contactless methods, for example, by gesture recognition, or as a function of the state of the pupil or eyelid determined by a camera and suitable evaluation electronics.

LIST OF REFERENCE CHARACTERS 1 outer pane
2 inner pane
3a first intermediate layer
3b second intermediate layer
3c third intermediate layer
4 barrier material
5 functional element having electrically controllable optical properties
5.1,5.2,5.3,5.4 lateral face of the functional element 5
6 tinted region of the first intermediate layer 3a
8 exit surface of the active layer 11
9 masking print
11 active layer of the functional element 5
12 surface electrode of the functional element 5
13 surface electrode of the functional element 5
14 carrier film
15 carrier film
20 extrusion die
24,34 heated barrier material 30 spray nozzle
31 spray jet, spray mist
32 compressed air
100 composite pane
B central field of vision of the windshield
D upper edge of the windshield, roof edge
M lower edge of the windshield, engine edge
d thickness, material thickness
X-X' section line
Z enlarged region

The invention claimed is:

1. A functional element having electrically controllable optical properties, comprising
a stack sequence of at least:
a first carrier film,
an active layer, and
a second carrier film,
wherein at least one exit surface of the active layer on at least one lateral face of the functional element is sealed at least in sections with a barrier material, and the barrier material is extruded onto the exit surface or is sprayed onto the exit surface,
wherein the barrier material is arranged directly on the lateral face of the stack sequence of the functional element and directly on the exit surface of the active layer and lateral faces of the carrier films,
wherein the barrier material is arranged bead-like on the lateral faceand is not implemented as a film,
wherein the barrier material is formed such that it prevents the diffusion of plasticizer through the barrier material,
wherein the barrier material is made of the same thermoplastic material as the carrier films,
wherein the barrier material protrudes beyond all lateral faces of the functional element and covers an edge area of an upper side of the second outer carrier film and a lower side of the first outer carrier film, and
wherein the barrier material and surfaces of the first outer carrier film and the second outer carrier film coming into contact with the barrier film have a fusion connection by localized melting.

2. The functional element according to claim 1, wherein the exit surfaces on all lateral faces are completely sealed with the barrier material or wherein at least one of the lateral faces are completely sealed with the barrier material.

3. The functional element according to claim 1, wherein the functional element is a polymer dispersed liquid crystal (PDLC) film.

4. The functional element according to claim 1, wherein the barrier material is plasticizer-poor or plasticizer-free.

5. The functional element according to claim 1, wherein the barrier material has, over the exit surface, a thickness d of at least 0.1 mm.

6. A composite pane having a functional element, comprising:
a second stack sequence comprising an outer pane, a first intermediate layer, a second intermediate layer, and an inner pane, wherein the first and second intermediate layers contain at least one thermoplastic polymer film with at least one plasticizer,
wherein, between the first intermediate layer and the second intermediate layer, a functional element having electrically controllable optical properties according to claim 1 is arranged at least in sections.

7. The composite pane according to claim 6, wherein the intermediate layer contains at least 3 wt.-% of a plasticizer and the plasticizer contains or is made of aliphatic diesters of tri- or tetraethylene glycol.

8. The composite pane according to claim 6, wherein the intermediate layer contains at least 60 wt.-% polyvinyl butyral (PVB).

9. A method for producing a functional element having electrically controllable optical properties according to claim 1, wherein at least
a) a stack sequence of at least
a first carrier film,
an active layer, and
a second carrier film
is provided, and
b) an exit surface of the active layer on at least one lateral face of the functional element is sealed at least in sections with a barrier material, wherein the barrier material is extruded in a heated state directly onto the exit surface or is sprayed directly onto the exit surface.

10. The method according to claim 9, wherein in a following step
c) an outer pane, a first intermediate layer, the functional element having electrically controllable optical properties, a second intermediate layer, and an inner pane are arranged one over another in this order, and
d) the outer pane and the inner pane are joined by lamination, wherein an intermediate layer with an embedded functional element is formed from the first intermediate layer and the second intermediate layer.

11. A method comprising utilizing a functional element according to claim 1 in a windshield or roof panel of a vehicle, wherein the functional element is used as a sun visor.

12. A method comprising utilizing a functional element according to claim 1 in an interior glazing or exterior glazing in a vehicle or a building, wherein the electrically controllable functional element is used as a sun screen or as a privacy screen.

13. The functional element according to claim 2, wherein all lateral faces are completely sealed with the barrier material.

14. The functional element according to claim 4, wherein the barrier material contains or is made of polyethylene terephthalate (PET) or polyvinyl fluoride (PVF).

* * * * *